US010616484B2

(12) United States Patent
Cohen et al.

(10) Patent No.: US 10,616,484 B2
(45) Date of Patent: Apr. 7, 2020

(54) FRAME SYNCRHONIZATION IN A DUAL-APERTURE CAMERA SYSTEM

(71) Applicant: Corephotonics Ltd., Tel-Aviv (IL)

(72) Inventors: Noy Cohen, Tel-Aviv (IL); Gal Shabtay, Tel-Aviv (IL); Oded Gigushinski, Herzlia (IL); Nadav Geva, Giv'atayim (IL); Anat Leshem, Tel-Aviv (IL); Gil Bachar, Tel-Aviv (IL)

(73) Assignee: Corephotonics Ltd., Tel Aviv (IL)

(*) Notice: Subject to any disclaimer, the term of this patent is extended or adjusted under 35 U.S.C. 154(b) by 0 days.

(21) Appl. No.: 15/570,346

(22) PCT Filed: Jun. 12, 2017

(86) PCT No.: PCT/IB2017/053470
§ 371 (c)(1),
(2) Date: Oct. 29, 2017

(87) PCT Pub. No.: WO2017/221106
PCT Pub. Date: Dec. 28, 2017

(65) Prior Publication Data
US 2018/0359392 A1 Dec. 13, 2018

Related U.S. Application Data

(60) Provisional application No. 62/351,990, filed on Jun. 19, 2016.

(51) Int. Cl.
*H04N 5/232* (2006.01)
*H04N 5/247* (2006.01)
(Continued)

(52) U.S. Cl.
CPC ....... *H04N 5/23245* (2013.01); *G02B 13/009* (2013.01); *G02B 13/0015* (2013.01);
(Continued)

(58) Field of Classification Search
CPC ........ H04N 5/04; H04N 5/0733; H04N 5/225; H04N 5/2258; H04N 5/2259;
(Continued)

(56) References Cited

U.S. PATENT DOCUMENTS 4,199,785 A 4/1980 McCullough et al.
5,005,083 A 4/1991 Grage et al.
(Continued)

FOREIGN PATENT DOCUMENTS

CN 101276415 A 10/2008
CN 102739949 A 10/2012
(Continued)

OTHER PUBLICATIONS

Statistical Modeling and Performance Characterization of a Real-Time Dual Camera Surveillance System, Greienhagen et al., Publisher: IEEE, 2000, 8 pages.
(Continued)

*Primary Examiner* — Lin Ye
*Assistant Examiner* — Chriss S Yoder, III
(74) *Attorney, Agent, or Firm* — Nathan & Associates; Menachem Nathan

(57) ABSTRACT

A dual-aperture camera comprising a first camera having a first sensor and a first image signal processor (ISP), the first camera operative to output a first stream of frames, a second camera having a second sensor and a second ISP, the second camera operative to output a second stream of frames, and a synchronization and operation control module configurable to control operation of one camera in a fully operational mode and operation of the other camera in a partially operational mode and to output an output of the fully operational camera as a dual-aperture camera output, whereby the partially operational mode of the other camera reduces a dual-aperture camera the power consumption in
(Continued)

comparison with a full operational mode of the other camera.

4 Claims, 1 Drawing Sheet

(51) Int. Cl.
    *H04N 5/225*          (2006.01)
    *H04N 5/073*          (2006.01)
    *G02B 13/00*          (2006.01)
    *G02B 27/00*          (2006.01)
    *H04N 5/04*            (2006.01)
    *H04N 7/01*            (2006.01)

(52) U.S. Cl.
    CPC ........... *G02B 27/0075* (2013.01); *H04N 5/04*
         (2013.01); *H04N 5/0733* (2013.01); *H04N*
         *5/2258* (2013.01); *H04N 5/2259* (2013.01);
         *H04N 5/23212* (2013.01); *H04N 5/23232*
         (2013.01); *H04N 5/23241* (2013.01); *H04N*
         *5/23296* (2013.01); *H04N 5/247* (2013.01);
         *H04N 7/0127* (2013.01)

(58) Field of Classification Search
    CPC ........... H04N 5/23203; H04N 5/23212; H04N
         5/23232; H04N 5/23241; H04N 5/23245;
         H04N 5/23296; H04N 5/247; H04N
         7/0127; G02B 13/0015; G02B 13/009;
         G02B 13/02; G02B 27/0075
    See application file for complete search history.

(56) References Cited

U.S. PATENT DOCUMENTS

| | | |
|---|---|---|
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,436,660 A | 7/1995 | Sakamoto |
| 5,444,478 A | 8/1995 | Lelong et al. |
| 5,459,520 A | 10/1995 | Sasaki |
| 5,657,402 A | 8/1997 | Bender et al. |
| 5,682,198 A | 10/1997 | Katayama et al. |
| 5,768,443 A | 6/1998 | Michael et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,208,765 B1 | 3/2001 | Bergen |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,676,146 B2 | 3/2010 | Border et al. |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 2002/0005902 A1 | 1/2002 | Yuen |
| 2002/0030163 A1 | 3/2002 | Zhang |
| 2002/0063711 A1 | 5/2002 | Park et al. |
| 2002/0075258 A1 | 6/2002 | Park et al. |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |

(56) References Cited

U.S. PATENT DOCUMENTS

| | | |
|---|---|---|
| 2004/0061788 A1 | 4/2004 | Bateman |
| 2004/0141086 A1 | 7/2004 | Mihara |
| 2004/0240052 A1 | 12/2004 | Minefuji et al. |
| 2005/0013509 A1 | 1/2005 | Samadani |
| 2005/0046740 A1 | 3/2005 | Davis |
| 2005/0157184 A1 | 7/2005 | Nakanishi et al. |
| 2005/0168834 A1 | 8/2005 | Matsumoto et al. |
| 2005/0200718 A1 | 9/2005 | Lee |
| 2006/0054782 A1 | 3/2006 | Olsen et al. |
| 2006/0056056 A1 | 3/2006 | Ahiska et al. |
| 2006/0102907 A1 | 5/2006 | Lee et al. |
| 2006/0125937 A1 | 6/2006 | LeGall et al. |
| 2006/0170793 A1 | 8/2006 | Pasquarette et al. |
| 2006/0175549 A1 | 8/2006 | Miller et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2007/0024737 A1 | 2/2007 | Nakamura et al. |
| 2007/0126911 A1 | 6/2007 | Nanjo |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1* | 1/2008 | Li ................ H04N 5/225 348/207.99 |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0117316 A1 | 5/2008 | Orimoto |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0165131 A1 | 7/2010 | Makimoto et al. |
| 2010/0238327 A1 | 9/2010 | Griffith et al. |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164172 A1 | 7/2011 | Shintani et al. |
| 2011/0229054 A1 | 9/2011 | Weston et al. |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0298966 A1 | 12/2011 | Kirschstein et al. |
| 2012/0008023 A1 | 1/2012 | Wajs |
| 2012/0026366 A1 | 2/2012 | Golan et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0076922 A1 | 3/2013 | Shihoh et al. |
| 2013/0093842 A1 | 4/2013 | Yahata |
| 2013/0113894 A1 | 5/2013 | Mirlay |
| 2013/0135445 A1 | 5/2013 | Dahi et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0270419 A1 | 10/2013 | Singh et al. |
| 2013/0278785 A1 | 10/2013 | Nomura et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0071330 A1* | 3/2014 | Zhang ............... H04N 5/2258 348/345 |
| 2014/0118584 A1 | 5/2014 | Lee et al. |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0138381 A1 | 5/2015 | Ahn |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0253543 A1 | 9/2015 | Mercado |
| 2015/0253647 A1 | 9/2015 | Mercado |
| 2015/0271471 A1 | 9/2015 | Hsieh et al. |
| 2015/0286033 A1 | 10/2015 | Osborne |
| 2015/0334309 A1 | 11/2015 | Peng et al. |
| 2016/0042522 A1 | 2/2016 | Wajs et al. |
| 2016/0044250 A1 | 2/2016 | Shabtay et al. |
| 2016/0070088 A1 | 3/2016 | Koguchi |
| 2016/0154202 A1 | 6/2016 | Wippermann et al. |
| 2016/0212358 A1 | 7/2016 | Shikata |
| 2016/0241751 A1 | 8/2016 | Park |
| 2016/0241793 A1* | 8/2016 | Ravirala ............ H04N 5/247 |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0353008 A1 | 12/2016 | Osborne |
| 2016/0353012 A1 | 12/2016 | Kao et al. |
| 2017/0019616 A1 | 1/2017 | Zhu et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0242225 A1 | 8/2017 | Fiske |
| 2017/0289458 A1 | 10/2017 | Song et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0120674 A1 | 5/2018 | Avivi et al. |
| 2018/0150973 A1 | 5/2018 | Tang et al. |
| 2018/0241922 A1 | 8/2018 | Baldwin et al. |
| 2018/0295292 A1 | 10/2018 | Lee et al. |

FOREIGN PATENT DOCUMENTS

| | | |
|---|---|---|
| CN | 103024272 A | 4/2013 |
| CN | 103841404 A | 6/2014 |
| EP | 1536633 A1 | 6/2005 |
| EP | 1780567 A1 | 5/2007 |
| EP | 2523450 A1 | 11/2012 |
| JP | S59191146 A | 10/1984 |
| JP | 04211230 A | 8/1992 |
| JP | H07318864 A | 12/1995 |

(56) References Cited

FOREIGN PATENT DOCUMENTS

| | | | |
|---|---|---|---|
| JP | 08271976 A | 10/1996 | |
| JP | 2003298920 A | 10/2003 | |
| JP | 2004133054 A | 4/2004 | |
| JP | 2004245982 A | 9/2004 | |
| JP | 2005099265 A | 4/2005 | |
| JP | 2006238325 A | 9/2006 | |
| JP | 2007228006 A | 9/2007 | |
| JP | 2007306282 A | 11/2007 | |
| JP | 2008076485 A | 4/2008 | |
| JP | 2011085666 A | 4/2011 | |
| JP | 2013106289 A | 5/2013 | |
| KR | 20090058229 A | 6/2009 | |
| KR | 20100008936 A | 1/2010 | |
| KR | 20140014787 A | 2/2014 | |
| KR | 101477178 B1 | 12/2014 | |
| KR | 20150118012 A | 10/2015 | |
| WO | 2010122841 A1 | 10/2010 | |
| WO | 20140199338 A | 12/2014 | |
| WO | 20150015383 A1 | 2/2015 | |
| WO | 2018130898 A1 | 7/2018 | |

OTHER PUBLICATIONS

A 3MPixel Multi-Aperture Image Sensor with 0.7μm Pixels in 0.11μm CMOS, Fife et at, Stanford University, 2008, 3 pages.
Dual camera intelligent sensor for high definition 360 degrees surveillance, Scotti et al., Publisher: IET, May 9, 2000, 8 pages.
Dual-sensor foveated imaging system, Hua et al., Publisher: Optical Society of America, Jan. 14, 2008, 11 pages.
Defocus Video Matting, McGuire et al., Publisher: ACM SIGGRAPH, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM SIGGRAPH, 9 pages.
Superimposed multi-resolution imaging, Carles et al., Publisher: Optical Society of America, 2017, 13 pages.
Viewfinder Alignment, Adams et al., Publisher: EUROGRAPHICS, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.
International Search Report and Written Opinion issued in relation to PCT patent application PCT/IB2017/053470 dated Oct. 13, 2017, 11 pages.

* cited by examiner

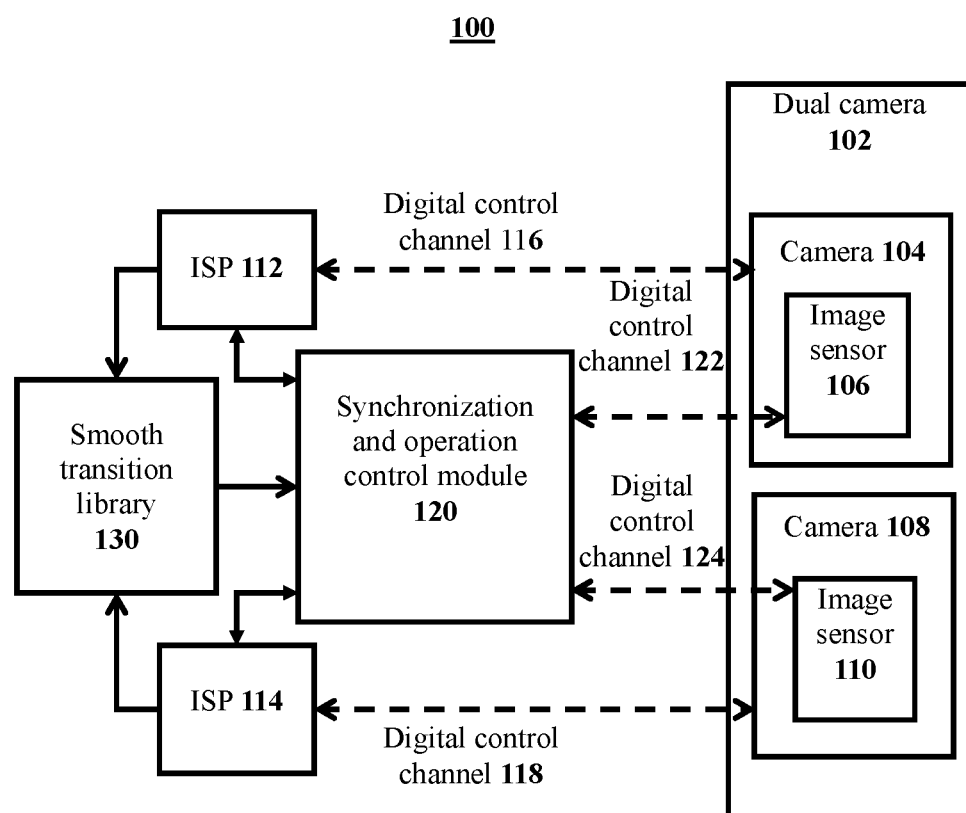

FRAME SYNCRHONIZATION IN A DUAL-APERTURE CAMERA SYSTEM

CROSS REFERENCE TO RELATED APPLICATIONS

This application is a 371 application from international patent application PCT/IB2017/053470 and is related to and claims priority from U.S. Provisional Patent Application No. 62/351,990 filed Jun. 19, 2016, which is incorporated herein by reference in its entirety.

FIELD

Embodiments disclosed herein relate in general to camera systems that comprise two or more cameras (also referred to as "dual-cameras" or "dual-aperture cameras") and are connected to host devices that process camera data and require synchronization between frames output by two or more cameras to reduce power consumption.

BACKGROUND

Digital camera modules are currently being incorporated into a variety of host devices. Such host devices include cellular telephones, personal data assistants (PDAs), computers, and so forth. Consumer demand for digital camera modules in host devices continues to grow.

There is an ever-increasing demand from host device manufacturers to include higher-performance cameras, with better capabilities such as optical zoom, improved low-light performance and higher image quality. To tackle this demand, new camera systems have been proposed recently. Such camera systems include two cameras aligned to look in the same direction, with partially or fully overlapping fields of view (FOVs) and are referred to herein as "dual-camera" systems (or "dual-aperture camera" systems, with two apertures A and B), see e.g. international patent applications PCT/IB2014/062180, PCT/IB2014/063393 and PCT/IB2016/050844. The two cameras may have similar FOVs or very different FOVs, depending on the lenses used in each. It has been shown (see e.g. PCT/IB2014/062180 and PCT/IB2014/063393) that the images from the two cameras may be "stitched" or "fused" together according to a dedicated algorithm to form a composite image, with improved resolution, improved noise performance and improved image quality (at least for some part of the composite image field of view). The image stitching or image fusion algorithm can be implemented in software, running on an application processor (AP), or in hardware (hard-wired implementation).

It has also been shown (see e.g. co-owned U.S. Pat. No. 9,185,291) that some dual-camera systems, such as ones that provide high-quality zoom during preview or video recording or as ones that provide enhanced low light performance, may include a transition between one camera stream to the other camera stream in order to generate an output stream of frames, which is used in turn to show the preview or to record the video. This transition takes place at a certain zoom factor (ZF) when zooming in and out. In some cases, it is beneficial to keep the transition between the two cameras as smooth as possible—for example, in case the two cameras in the dual-camera system have different FOVs and where the dual-camera system implements continuous zooming between the two cameras. A smooth transition is a transition in which the user does not notice the transition point between the two cameras. A smooth transition should be smooth in time and space, namely continuous in both aspects.

Furthermore, it is known that some dual-camera systems may include calculation of a depth map from the two camera frames. A depth map is a map of the pixels in the frame, in which each object's relative distance in a scene is determined from the spatial shift of the object's image between the two frames. In some embodiments, the depth map requires a registration step between the frames from the two cameras. A registration step is a step in which a match is found between pixels in the two images that correspond to the same object in the scene, and a disparity value that represents the offset between the location on the sensor of the two corresponding pixels is assigned to each pair of matched pixels to form a "dense disparity map". Alternatively, a registration step may include extracting features from the two frames, finding matches between features corresponding to the same object in the scene and calculating from the matched features a "sparse depth map". The depth map may be calculated on a preview or video stream, or on a snapshot image.

For the three applications mentioned above (fusion of two captured images, transition between two streams of frames and creating a depth map from two camera frames), the synchronization of the acquisition time of the frames is an important requirement and common practice. For example, when registering information between two frames from the two cameras, any object motion in the scene or motion of the dual-aperture camera may result in registration errors if the frame acquisition time is not synchronized within a certain period of time (e.g. less than 3-5 msec). The registration errors can lead to wrong depth estimations when calculating a depth map. In smooth transition, lack of synchronization in time between pairs of frames from the two cameras may lead to a noticeable discontinuity when switching from one camera to the other.

A known in the art synchronization method between two camera sensors includes sending a synchronization signal every frame from one sensor, denoted "master sensor", to the second sensor, denoted "slave sensor". This method requires the two cameras to output the stream of frames at approximately the same rate to stay synchronized (for example, both sensors will output the frames at a rate of 30 fps).

Apart from maintaining synchronization, there are other benefits to keeping the two cameras streaming in parallel at all times (even when only one camera is actually used to generate the output image or frame): first, it is desired to maintain accurate information of focus, white balance and light gain level (known as "3A information") for both cameras, even when one is not used, in order to be able to use information from the not used camera with as small a latency as possible. If one camera is set to be in "standby" mode and does not stream frames, it may take up to several seconds until white balance, exposure and focus converge to values that match the scene when configuring the camera to start streaming frames. This time may hinder user experience and may prevent smooth transition from one camera to the other, for example when zooming-in or zooming-out, or for example when switching from regular light mode to low light mode. Second, registration may be required to be maintained at all times, for example for the purpose of calculating a depth map of the scene from the two images. However, running two camera sensors in parallel carries the penalty of doubling power consumption.

In summary, to enable fast output switching between one aperture (camera) and another aperture (camera) in a dual-camera, both camera need to be operative and synchronized. This creates a power consumption problem, since keeping two cameras fully operational results in doubling the combined camera power consumption in comparison with that of a single camera system. At present, there are no satisfactory solutions to this power consumption problem.

SUMMARY

In exemplary embodiments, there is provided a system comprising a dual-aperture camera that includes a first camera operative to output a respective first camera output and a second camera operative to output a respective second camera output, and a synchronization and operation control module configurable to control operation of one camera in a fully operational mode and operation of the other camera in a partially operational mode, whereby operation of the dual-aperture camera with one camera in partially operational mode and another camera in fully operational mode reduces system power consumption in comparison with the system power consumption when both cameras operate in fully operational mode.

In an exemplary embodiment, the synchronization and operation control module is further configurable to output the output of the fully operational camera as a dual-aperture camera output.

In an exemplary embodiment, the first camera includes a first camera image sensor that communicates with an associated first image signal processor (ISP) and is operative to output a first stream of frames, the second camera includes a second camera image sensor that communicates with an associated second ISP and is operative to output a second stream of frames, and the synchronization and operation control module is further configurable to control operation of the first camera image sensor and/or the first ISP in a fully operational mode and operation of the second camera image sensor and/or the second ISP in a partially operational mode.

In an exemplary embodiment, the first camera includes a first camera image sensor that communicates with an associated first image signal processor (ISP) and is operative to output a first stream of frames, the second camera includes a second camera image sensor that communicates with an associated second ISP and is operative to output a second stream of frames, and the synchronization and operation control module is further configurable to control operation of the first camera image sensor and/or the first ISP in a partially operational mode and operation of the second camera image sensor and/or the second ISP in a fully operational mode.

In an exemplary embodiment, the synchronization and operation control module is further configurable to synchronize pairs of frames processed by the first ISP and the second ISP.

In an exemplary embodiment, the synchronization and operation control module is further configurable to synchronize pairs of frames processed by the first ISP and the second ISP.

In an exemplary embodiment, the control of the operation of the first camera image sensor in a fully operational mode and control of the operation of the second camera image sensor in a partially operational mode includes control of a respective frame size of each of the first and second camera image sensors.

In an exemplary embodiment, the control of the operation of the first camera image sensor in a fully operational mode and control of the operation of the second camera image sensor in a partially operational mode includes control of a respective frame rate of each of the first and second camera image sensors.

In an exemplary embodiment, the control of the operation of the first camera image sensor in a fully operational mode and control of the operation of the second camera image sensor in a partially operational mode includes control of a respective processing rate of each of the first and second ISPs.

In an exemplary embodiment, the system further comprises a smooth transition library for providing to the synchronization and operation control module an instruction used in configuring the synchronization and operation control module to control operation of each camera and to output the dual-aperture camera output.

In an exemplary embodiment, the frame size of the camera in partially operational mode is a fraction of the frame size of the camera in fully operational mode. In an exemplary embodiment, the frame rate of the camera in partially operational mode is a fraction of the frame rate of the camera in fully operational mode. In an exemplary embodiment, the ISP processing rate of the camera in partially operational mode is a fraction of the ISP processing rate of the camera in fully operational mode. Exemplarily, the value of the fraction may be a third. The fraction may of course assume any another value smaller than 1. For example, the fraction may range between ¼ and ½.

In exemplary embodiments, there is provided a method comprising providing a dual-aperture camera that includes a first camera operative to output a respective first camera output and a second camera operative to output a respective second camera output, and operating one camera in a fully operational mode and operating the other camera in a partially operational mode, thereby reducing dual-camera power consumption in comparison with a power consumption when both cameras operate in fully operational mode.

In an exemplary embodiment, the method further comprises outputting the output of the camera operating in fully operational mode as a dual-aperture camera output.

In an exemplary embodiment, the method further comprises switching between the first and second cameras and operating the second camera in a fully operational mode and the first camera in a partially operational mode.

In an exemplary embodiment, the camera output includes a respective stream of frames, and the method further comprises synchronizing a parameter of the output of the camera operating in fully operational mode with a parameter of the output of the camera operating in partially operational mode before outputting a dual-camera output.

BRIEF DESCRIPTION OF THE DRAWINGS

Aspects, embodiments and features disclosed herein will become apparent from the following detailed description when considered in conjunction with the accompanying drawings.

FIG. 1 shows schematically a system according to an exemplary embodiment disclosed herein.

DETAILED DESCRIPTION

Embodiments disclosed below relate to dual-aperture cameras with reduced power consumption and methods for operating such cameras. Each camera in the dual-aperture camera includes a camera image sensor (or simply "sensor") which is in communication with an associated image signal processor (ISP). In some embodiments, the two sensors may be associated with a single ISP and time-share it. The reduced power consumption arises from the fact that most of the time one camera is "fully operational" while the other camera is less than fully operational or "partially operational". As used herein, "fully operational camera" or "camera in fully operational mode" refers to a camera in which the operation of the respective image sensor is at a regular frame rate or frame size and the operation of the associated ISP is at a regular ISP processing rate. As used herein, "partially operational camera" or "camera in partially operational mode" refers to a camera in which the operation of the respective image sensor is at a reduced frame rate or frame size relative to its fully operational frame rate or frame size, and/or that the operation of the associated ISP is at a reduced processing rate relative to its regular (fully operational) ISP processing rate. In one example, the fully operational camera may output frames at 30-60 frames per second (FPS), while the partially operational camera may output frames at a lower rate of 5-10 FPS. In another example, the fully operational camera may output frames at 13 Mpxl size per frame, while the partially operational camera may output frames at a lower size of 0.2-8 Mpxl per frame.

A synchronization mechanism enables fast switching of the dual-aperture camera output from the output of the fully operational camera to the output of the partially operational camera. The synchronization mechanism may be performed exemplarily by a dedicated software (SW) module. Alternatively, the synchronization mechanism may be included in hardware (HW). The novel synchronization mechanism and method presented below allow synchronization of two camera streams even when one camera is fully operational while the other camera is partially operational. The disclosed synchronization keeps frames of the two cameras synchronized while reducing power consumption, and allows calculation of a depth map from respective frames of the two cameras at all times.

Switching between cameras is decided by user inputs, such as selection of zoom factor or scene, and is done by a smooth transition library, see below. Exemplarily, the library is a smooth transition library. The way a decision on the timing of transition is made is known in the art, see e.g. co-owned U.S. Pat. No. 9,185,291. Just before the dual-aperture camera output is switched from the output of the fully operational camera to the output of the partially operational camera, the partially operational camera becomes fully operational with respective fully operational frame rate and/or frame size and/or ISP processing rate. After the dual-aperture camera output switching, the fully operational camera becomes partially operational, with respective partially operational frame rate and/or frame size and/or ISP processing rate.

If the fully operational camera was to stop streaming frames instead of being switched to "partially operational" mode, the switching time from the fully operational camera to the partial operational camera would have increased compared to the switching time when using the proposed operation of the partially operational camera. If the partially operational camera was to operate at full rate and a full frame size while the fully operational camera outputs frames, the power consumption of the entire dual-camera system would have increased, compared to the power consumption when using the proposed operation of the partially operational camera.

FIG. 1 shows schematically a system 100, according to an exemplary embodiment disclosed herein System 100 includes a dual-aperture camera 110 with two camera image sensors (or simply "sensors") 106 and 110. Camera 110 further includes several mechanisms (not shown in FIG. 1) such as camera body, lenses, actuation mechanism, light filters, etc. as known in the art for camera module design (see for example patent applications PCT/IB2014/062180, PCT/IB2014/063393 and PCT/IB2016/050844). Each sensor is associated with a respective camera and its respective components. Exemplarily, system 100 can be a dual-aperture zoom camera in which case sensor 106 is associated with a Wide field of view (FOV) lens (not shown) and sensor 110 is associated with a Tele (narrow) FOV lens (not shown). In some embodiments, one sensor may be a color sensor (with a color filter array (CFA) such as a Bayer array on the sensor pixels) and the other sensor may be a monochromatic sensor (without a CFA on its pixels). System 100 further includes two image signal processors (ISPs), ISP 112 and ISP 114 associated respectively with sensors 106 and 110. Each ISP processes a single camera output frame and generates a processed frame. Processing steps may include signal pedestal determination and removal, white balance, de-noising, removal of lens shading effect, de-mosaicing, sharpening, color correction, gamma correction, cropping and scaling of the frame and other steps, as known in the art. ISP 112 is connected to sensor 106 via one or more digital control channels 116 per camera (e.g. MIPI, I2C, SPI), and ISP 114 is connected to sensor 110 via one or more digital control channels 118 per camera (e.g. MIPI, I2C, SPI).

System 100 further includes a synchronization and operation control module 120 (in short and for simplicity "module 120"). Module 120 controls the frame rates and/or sizes at which sensors 106 and 110 operate and the processing rates at which the associated ISPs 112 and 114 operate and is also in charge of synchronizing pairs of frames that are processed and output by ISPs 112 and 114. System 100 further includes a smooth transition library 130. Module 120 receives frames and frame parameters such as time stamps and requested frame rates from ISPs 112 and 114 and/or from smooth transition library 130, and operates based on these parameters. Module 120 communicates with sensors 106 and 110 through, respectively, digital control channels 122 and 124.

The frames output by ISPs 112 and 114 are passed to smooth transition library 130 along with other parameters such as frames sizes, exposure time, analog gain information, ISP crop and scale information, frame rate, focus position information and requested zoom factor. Smooth transition library 130 is responsible for smoothly transitioning from one stream of frames to another stream of frames, depending on several parameters such as zoom factor, object depths in the pictured scene, etc. The smooth transition library can send a signal to module 120 to change a partially operational camera to be a fully operational camera and vice versa, and/or to change the frame size and/or to change the frame rate of the camera sensor and/or to change the processing rate of the respective ISP.

In some embodiments, the control of the frame rate by module 120 may be performed via increasing or decreasing the vertical blanking time of sensors 106 and 110. Increasing the vertical blanking time reduces the frame rate, while decreasing the vertical blanking time increases the frame rate.

Modules 120 and 130 may be software modules or may be implemented in hardware (HW). They may be included in a single HW processor or in several HW processors. Modules 112 and 114 are usually HW modules. ISP 112 and ISP 114 may be implemented in separate HW modules (e.g. microprocessor, CPU, GPU, dedicated hardware, FPGA etc.) or in a single HW module.

Following is a first embodiment of an exemplary method of operation of system 100 and in particular of operation of module 120 in a desired scenario in which one sensor (110) streams frames at a low frame rate and the other sensor (106) streams frames at a high frame rate. Thus in this example, sensor 110 is the sensor of the "partially operational" camera and sensor 106 is the sensor of the "fully operational" camera. It should be noted that the role of low-frame-rate-sensor (partially operational) and high-frame-rate-sensor (fully operational) is interchangeable within the same system, and their definitions depend on parameters such as zoom factor and pictured scene information, and shown here only by means of example. It should also be noted that in this scenario, the operation rates of ISPs 112 and 114 match the rate of the streams of frames that arrive from sensors 106 and 110, respectively. For example, if sensor 110 streams at low frame rate, the operation rate of ISP 114 is reduced compared to that of ISP 112, which receives frames at a higher frame rate from sensor 106. In the exemplary operation and in detail:

1. Module 120 configures the vertical blanking time of sensor 106 to a value such that the sensor streams frames at a high frame rate, for example 30 FPS. Module 120 also configures the vertical blanking time of sensor 110 to a value such that it streams frames at a rate that is an integer divisor (fraction) of the high frame rate of sensor 106 (e.g. such that the frame rate ratio between the rates is 1/n, n being exemplarily an integer equal to or larger than 2).

2. Module 120 operates at the same frame rate as the high frame rate sensor. It continuously receives a new pair of frames from ISPs 112 and 114, along with meta-data information such as frame time stamps for each frame and a valid/invalid descriptor, which indicates whether the input frames are valid ones or not. The frames streamed from sensor 106 are all marked as "valid" frames. Frames streamed from sensor 110 are also marked as "valid" frames. However, if there is a pair of frames in which one frame from sensor 106 is valid and there is no corresponding frame from sensor 110, then a "dummy" frame may be used instead of the missing low-frame-rate frame and such dummy frame is marked as an "invalid" frame. For example, if sensor 106 streams at 30 FPS and sensor 110 streams at 1/3 of the high frame rate (i.e. at 10 FPS), then module 120 will receive a valid frame from sensor 106 about every 1/30 second and a valid frame from sensor about 110 about every 1/10 second. Since module 120 operates at the high frame rate, it will receive two valid frames only every $3^{rd}$ operation. Alternatively, module 120 may be called only when two valid input frames are available.

3. Module 120 compares the time stamps of the valid pair of frames and calculates the time difference between them. It then calculates the required modifications to the vertical blanking time of sensors 106 and/or 110 so that the time difference between the two valid frames will be minimized, and configures sensor 110 and/or sensor 106 to a new vertical blanking time.

4. Changes are applied to sensors 106 and/or 110 by sending a command through digital control channels 122 and 124 (e.g. I2C channels).

5. The requested frame rate from each of sensors 106 and 110 can be decided based on smooth transition library 130 requests. Smooth transition library 130 may request control module 120 to configure the same frame rate and/or frame size or different frame rates and/or frame sizes from sensors 106 and 110, based on different parameters such as zoom factor, scene parameters, system performance and user preference.

Following is a second embodiment of an exemplary method of operation of system 100 and in particular of module 120 in a desired scenario in which sensors 106 and 110 both stream frames at a high frame rate, ISP 114 processes frames at a low frame rate and ISP 112 processes frames at a high frame rate. Thus in this example, ISP 114 is the ISP of "partially operational" camera and ISP 112 is the ISP of "fully operational" camera. In this scenario, module 120 only controls the processing rates of ISP 112 and ISP 114. Frames that reach ISP 114 at high frame rate and are not processed by it are discarded. It should be noted that the role of low-frame-rate-sensor and high-frame-rate-sensor is interchangeable within the same system, and their definitions depend on parameters such as zoom factor and pictured scene information, and the exemplary selected roles are shown here only by means of example. In the exemplary operation and in detail:

1. Module 120 configures both the vertical blanking times of sensor 106 and sensor 110 and also the rates at which ISP 112 and ISP 114 operate. For example, sensors 106 and 110 are configured to stream frames at 30 FPS, ISP 112 is configured to operate at a rate equivalent to 30 FPS and ISP 114 is configured to operate at a rate equivalent to 10 FPS. The rate at which ISP 114 is configured to operate is set to be an integer divisor of the rate that ISP 112 is configured to operate in (e.g. so that the frame rate ratio between the rates is 1/n, n being an integer equal to or larger than 2).

2. Module 120 operates at the same frame rate as the high frame rate ISP 112. It continuously receives a new pair of frames from ISPs 112 and 114, along with meta-data information such as frame time stamps for each frame and a valid/invalid descriptor, which indicates whether the input frames are valid ones or not. The frames streamed from ISP 112 are all marked as "valid" frames. Frames streamed from ISP 114 are also marked as "valid" frames. However, if there is a pair of frames in which one frame arrives from ISP 112 and there is no corresponding frame from ISP 114, then a "dummy" frame may be used instead of the missing low-frame-rate frame and it is marked as an "invalid" frame. For example, if ISP 112 processes frames at 30 FPS and ISP 114 processes frames at 1/3 of the high frame rate, then module 120 will receive a valid frame from ISP 112 about every 1/30 second and a valid frame from ISP 114 about every 1/10 second. Since module 120 operates at the high frame rate, then it will receive two valid frames only every $3^{rd}$ operation. Alternatively, module 120 may be called only when two valid input frames are available.

3. Module 120 compares the time stamps of the valid pair of frames and calculates the time difference between them. It then calculates the required modifications to the operation rates of ISP 112 and ISP 114 and also the modification to the vertical blanking time of sensors 106 and/or 110, such that the time difference between the two valid frames will be minimized.

4. Changes are applied to sensors 106 and/or 110 via sending a command through digital control channels 122 and 124 (e.g. I2C channels).

In both of the examples above, the requested frame rate from each of sensors 106 and 110 and ISPs 112 and 114 can be decided based on smooth transition library 130 requests as known in the art, see e.g. co-owned U.S. Pat. No. 9,185,291. Library 130 may request module 120 to configure the same frame rate or different frame rates from sensors 106 and 110 and ISPs 112 and 114, based on different parameters like zoom factor, scene parameters, system performance and user preference.

Following is a third embodiment of an exemplary method of operation of system 100 and in particular of module 120 in a desired scenario where one sensor (110) streams frames at a low frame size and the other sensor (106) streams frames at a high frame size. In this case sensor 106 is the sensor of the fully operational camera and sensor 110 is the sensor of the partially operational camera. It should be noted that the role of low-frame-size-sensor (partially operational) and high-frame-size-sensor (fully operational) is interchangeable within the same system, and that their definitions depend on parameters such as zoom factor and pictured scene information, and shown here only by means of example. It should also be noted that in this scenario, the ISPs 112 and 114 operation complexity depends on the frame streams that arrive from sensors 106 and 110, respectively (for example, if sensor 110 streams at low frame size, the operation complexity of ISP 114 is reduced compared to that of ISP 112, which receives frames at a high frame size from sensor 106):

1. Module 120 configures the vertical blanking time of both sensors 106 and 110 to a value such that each sensor stream frames at a desired frame rate, for example 30 FPS.
2. Module 120 also configures the frame size of sensor 106 to high frame size (e.g. 13 mpxl) and the frame size of sensor 110 to a low frame size (e.g. 0.5 mpxl). It further informs ISPs 112 and 114 on the expected frame size for each ISP.
3. ISPs 112 and 114 set active and non-active hardware chains according to expected frame rate. ISPs 114 can for example reduce the number of active transistors (turn unneeded transistors off) and can reduce the overall power consumption.
4. Module 120 operates at the same frame rate as the sensors. It continuously receives a new pair of frames from ISPs 112 and 114, along with meta-data information such as frame time stamps for each frame.
5. Module 120 compares the time stamps of each pair of frames and calculates the time difference between them. It then calculates the required modifications to the vertical blanking times of sensors 106 and/or 110 so that the time difference between the two valid frames will be minimized, and configures sensor 110 and/or sensor 106 to a new vertical blanking time.
6. Changes are applied to sensors 106 and/or 110 via sending a command through digital control channels 122 and 124 (e.g. I2C channels).
7. The requested frame size from each of sensors 106 and 110 can be decided based on smooth transition library 130 requests. Smooth transition library 130 may request SW synchronization and operation control module 120 to configure the same frame size or different frame sizes from sensors 106 and 110, based on different parameters like zoom factor, scene parameters, system performance and user preference.

In a fourth embodiment of an exemplary method of operation of system 100, system 100 may operate such that one sensor is streaming at full frame rate and high frame size, while the second sensor operate at a low frame rate and a low frame size. In this embodiment, there is implementation of a combination of the operation methods presented above.

Table 1 shows a comparison of the four methods, with optional reduction of power. With the partially operational camera, each cell with "Full" text represents work at full power consumption, while each cell with "Partial" text represents reduction of power.

TABLE 1

|  |  | Method 1 | Method 2 | Method 3 | Method 4 |
|---|---|---|---|---|---|
| Fully operational camera | Sensor operation rate (e.g. of 106) | | Full (e.g. 30 FPS) | | |
|  | Frame size | | Full (e.g. 13 mpxl) | | |
|  | ISP operation rate (e.g. of 112) | | Full (e.g. 30 FPS) | | |
| Partially operational camera | Sensor operation rate (e.g. of 110) | Partial (e.g. 10 FPS) | Full (e.g. 30 FPS) | Full (e.g. 30 FPS) | Partial (e.g. 10 FPS) |
|  | Frame size | Full (e.g. 13 mpxl) | Full (e.g. 13 mpxl) | Partial (e.g. 0.5 mpxl) | Partial (e.g. 0.5 mpxl) |
|  | ISP operation rate (e.g. of 114) | Partial (e.g. 10 FPS) | Partial (e.g. 10 FPS) | Full (e.g. 30 FPS) | Partial (e.g. 10 FPS) |
| Synchronization and operation control module 120 operation rate | | Full (e.g. 30 FPS) | | | |
| Decision on transition\change in frame rate | | Done by smooth transition library 130 | | | |

In summary, the present application discloses a system and methods for operating the same, the system including a dual-camera in which the combined preview or video output comes either from one camera or another camera, depending on user defined zoom factor, scene selection and other parameters. Fast output switching with minimal power consumption penalty is enabled by operating the camera not used to generate the dual-camera image output in a special (partial) operation mode.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein. For example, while this description is focused on a dual-aperture camera, multi-aperture cameras with more than two apertures (cameras) may benefit from application of the methods described herein, if applied to any two cameras in a multi-aperture camera. In general, the disclosure is to be understood as not limited by the specific embodiments described herein, but only by the scope of the appended claims.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. A system, comprising:
a) a dual-aperture camera that comprises a first camera having a first camera image sensor that communicates with a first image signal processor (ISP) and is operative to output a first camera output, and a second camera having a second camera image sensor that communicates with a second ISP and is operative to output a second camera output; and
b) a synchronization and operation control module configurable to control operation of the first camera image sensor and/or the first ISP in a fully operational mode and operation of the second camera image sensor and/or the second ISP in a partially operational mode,
wherein the control of the operation of the first camera image sensor in the fully operational mode includes control to output a frame size of the first camera in the fully operation mode, and
wherein the control of the operation of the second camera image sensor in the partially operational mode includes control to output a fraction of a frame size of the second camera in the fully operational mode,
whereby operation of the dual-aperture camera with one camera in a partially operational mode and another camera in a fully operational mode reduces system power consumption in comparison with the system power consumption when both cameras operate in fully operational mode.

2. A system, comprising:
a) a dual-aperture camera that comprises a first camera having a first camera image sensor that communicates with a first image signal processor (ISP) and is operative to output a first camera output and a second camera having a second camera image sensor that communicates with a second ISP and is operative to output a second camera output; and
b) a synchronization and operation control module configurable to control operation of the first camera image sensor and/or the first ISP in a fully operational mode and operation of the second camera image sensor and/or the second ISP in a partially operational mode,
wherein the control of the operation of the first ISP in the fully operational mode includes control to output an ISP processing rate of the first camera in the fully operational mode, and
wherein the control of the operation of the second ISP in the partially operational mode includes control to output a fraction of an ISP processing rate of the second camera in the fully operational mode,
whereby operation of the dual-aperture camera with one camera in a partially operational mode and another camera in a fully operational mode reduces system power consumption in comparison with the system power consumption when both cameras operate in fully operational mode.

3. A method, comprising:
a) providing a dual-aperture camera that includes a first camera operative to output a respective first camera output and a second camera operative to output a respective second camera output;
b) operating one camera in a fully operational mode and operating the other camera in a partially operational mode; and
c) synchronizing a parameter of the output of the camera operating in the fully operational mode with a parameter of the output of the camera operating in the partially operational mode, wherein the parameter is a frame size and wherein a frame size of the camera operating in the partially operational mode is a fraction of the frame size of the same camera when operating in the fully operational mode,
thereby reducing dual-camera power consumption in comparison with a power consumption when both cameras operate in a fully operational mode.

4. A method, comprising:
a) providing a dual-aperture camera that includes a first camera operative to output a respective first camera output and a second camera operative to output a respective second camera output, wherein each camera includes a respective image sensor and a respective image signal processor (ISP);
b) operating one camera in a fully operational mode and operating the other camera in a partially operational mode; and
c) synchronizing a parameter of the output of the camera operating in the fully operational mode with a parameter of the output of the camera operating in the partially operational mode, wherein the parameter is an ISP processing rate and wherein the processing rate of the ISP of the camera operating in the partially operational mode is a fraction of the processing rate of the ISP of the same camera when operating in the fully operational mode,
thereby reducing dual-camera power consumption in comparison with a power consumption when both cameras operate in the fully operational mode.

* * * * *